(12) United States Patent  (10) Patent No.: US 7,444,227 B2
Tengler et al.  (45) Date of Patent: Oct. 28, 2008

(54) VEHICLE COMMUNICATION SYSTEM

(75) Inventors: Steve Tengler, Grosse Pointe Park, MI (US); Ronald Heft, Farmington Hills, MI (US)

(73) Assignee: Nissan Technical Center North America, Inc., Farmington Hills, MI (US)

( * ) Notice: Subject to any disclaimer, the term of this patent is extended or adjusted under 35 U.S.C. 154(b) by 477 days.

(21) Appl. No.: 11/246,178

(22) Filed: Oct. 11, 2005

(65) Prior Publication Data

US 2007/0083297 A1  Apr. 12, 2007

(51) Int. Cl.
G06F 15/16 (2006.01)
(52) U.S. Cl. ........................................ 701/100; 342/457
(58) Field of Classification Search ................ 701/100, 701/207, 208, 300; 455/456.1, 456.2, 463, 455/457, 566, 456.3; 342/357.08, 357.09, 342/357.1, 457
See application file for complete search history.

(56) References Cited

U.S. PATENT DOCUMENTS 6,480,885 B1 * 11/2002 Olivier ........................ 709/207
6,867,733 B2 * 3/2005 Sandhu et al. ......... 342/357.07
6,988,034 B1 * 1/2006 Marlatt et al. ................ 701/200
7,062,376 B2 * 6/2006 Oesterling ................... 701/207
2005/0021666 A1 * 1/2005 Dinnage et al. ............. 709/217
2005/0131716 A1   6/2005 Hanan et al.

OTHER PUBLICATIONS

Vehicle Safety Communications Project, TASK 3 Final Report; Mar. 2005; National Highway Traffic Safety Administration, U.S. Department of Transportation, Washington, D.C., U.S.A.

* cited by examiner

Primary Examiner—Dalena Tran
(74) Attorney, Agent, or Firm—Global IP Counselors, LLP

(57) ABSTRACT

A vehicle communication system is provided to facilitate meeting our people in nearby or neighboring cars with similar interests, desires or wants. The vehicle communication system has a host vehicle two way communication device, a host vehicle personal data storage component and a host vehicle personal data matching component. The host vehicle two way communication device conducts direct short range communications in a host vehicle broadcast area surrounding a host vehicle. The host vehicle personal data storage component broadcasts at least some of a host vehicle user's personal data and receives nearby user's desired profile requirement via the host vehicle two way communication device. The host vehicle personal data matching component compares host vehicle user's desired profile requirement that is based on the host vehicle user's personal data with the nearby user's desired profile requirement.

17 Claims, 7 Drawing Sheets

EDIT TOP-LEVEL PROFILE

23A

| MALE | 35 | SWF |
| --- | --- | --- |
| Gender | Age | Seeking |

Number20ForPres@yahoo.com
E-Mail Address

-- Not Listed --
Phone Number

USERID: LionsFan1003

SAVE

MATCH!

23A

USER ID: Smiley Bbeth

Age: 32    Seeking: SWM
Region: Southeastern Michigan
Occupation: Engineer
Marital Status: Single
Contact Info: E-mail Address Only Interests: Reading, Children, Golf,
         Philanthropy, Sports
Thoughts: Looking to meet someone
         who makes me laugh and think.

SAVE

FIG. 7

VEHICLE COMMUNICATION SYSTEM

BACKGROUND OF THE INVENTION

1. Field of the Invention

The present invention generally relates to a vehicle communication system for direct communication between vehicles. More specifically, the present invention relates to a vehicle using a vehicle to vehicle communication system to facilitate meeting of people in nearby or neighboring cars with similar interests, desires or wants.

2. Background Information

In today's society, it has become increasingly difficult to meet people with similar interests, desires or wants. Recently, many people have been looking to the internet to meet people with similar interests, desires or wants. The internet has all kinds of websites for getting people together with similar interests, desires or wants. For example, there are many dating websites, classified ads websites, various websites for different types of hobbies, etc. However, the internet searches all over the world so it is sometimes difficult to meet the correct person in a convenient location. Moreover, in order to access these websites, you need to be connected to the internet. Typically, people access internet using a computer. However, most people do not carry a computer wherever they go. While many mobile cell phones have internet access, the cell phones have very small screens and small buttons, which make them difficult to use.

However, it has been proposed that dedicated short range communications (DSRC) will be used in vehicles for a wide range of applications. DSRC technology will allow vehicles to communicate directly with other vehicles and with roadside units to exchange a wide range of information. In the United States, DSRC technology will use a high frequency radio transmission (5.9 GHz) that offers the potential to effectively support wireless data communications between vehicles, and between vehicles, roadside units and other infrastructure. An important feature of DSRC technology is the capability of conducting both point-to-point wireless communications and broadcast wireless messages in a limited broadcast area. When communications are established from one vehicle to other vehicles in close proximity, this information would be communicated between the vehicles to provide the vehicles with a complete understanding of the vehicles in the broadcast area. This information then can be used by the vehicles for both vehicle safety applications and non-safety applications.

In view of the above, it will be apparent to those skilled in the art from this disclosure that there exists a need for an improved vehicle communication system in which people with similar interests, desires or wants can easily meet each other. This invention addresses this need in the art as well as other needs, which will become apparent to those skilled in the art from this disclosure.

SUMMARY OF THE INVENTION

It has been realized that many people spend a significant amount of time in their automobile. Therefore, it would be desirable to provide a method to bring together people with similar interest, desires or wants while they are in their automobile. Recently, vehicles have been proposed to be equipped with wireless communications that permits communications between vehicles and between infrastructures, such as roadside units.

The present invention was conceived in view of these issues. One object of the present invention is to provide a vehicle communication system to facilitate meeting our people in nearby or neighboring cars with similar interests, desires or wants. The vehicle communication system basically comprises a host vehicle two way communication device, a host vehicle personal data storage component and a host vehicle personal data matching component. The host vehicle two way communication device is configured to conduct direct short range communications in a host vehicle broadcast area surrounding a host vehicle. The host vehicle personal data storage component is configured to store host vehicle user's personal data and store a nearby user's desired profile requirement from a nearby user within the host vehicle broadcast area surrounding the host vehicle. The host vehicle personal data storage component is operatively connected to the host vehicle two way communication device, which is configured to broadcast at least some of the host vehicle user's personal data and receive the nearby user's desired profile requirement. The host vehicle personal data matching component is configured to compare host vehicle user's desired profile requirement that is based on the host vehicle user's personal data with the nearby user's desired profile requirement.

These and other objects, features, aspects and advantages of the present invention will become apparent to those skilled in the art from the following detailed description, which, taken in conjunction with the annexed drawings, discloses a preferred embodiment of the present invention.

BRIEF DESCRIPTION OF THE DRAWINGS

Referring now to the attached drawings which form a part of this original disclosure:

FIG. 6 is a pictorial representation of a second screen display of the vehicle's navigation system that is integrated with the on-board unit for conducting in accordance with the present invention;

FIG. 7 is a pictorial representation of a third screen display of the vehicle's navigation system that is integrated with the on-board unit for conducting in accordance with the present invention;

DETAILED DESCRIPTION OF THE PREFERRED EMBODIMENTS

Selected embodiments of the present invention will now be explained with reference to the drawings. It will be apparent to those skilled in the art from this disclosure that the following descriptions of the embodiments of the present invention are provided for illustration only and not for the purpose of limiting the invention as defined by the appended claims and their equivalents.

Figure 1:
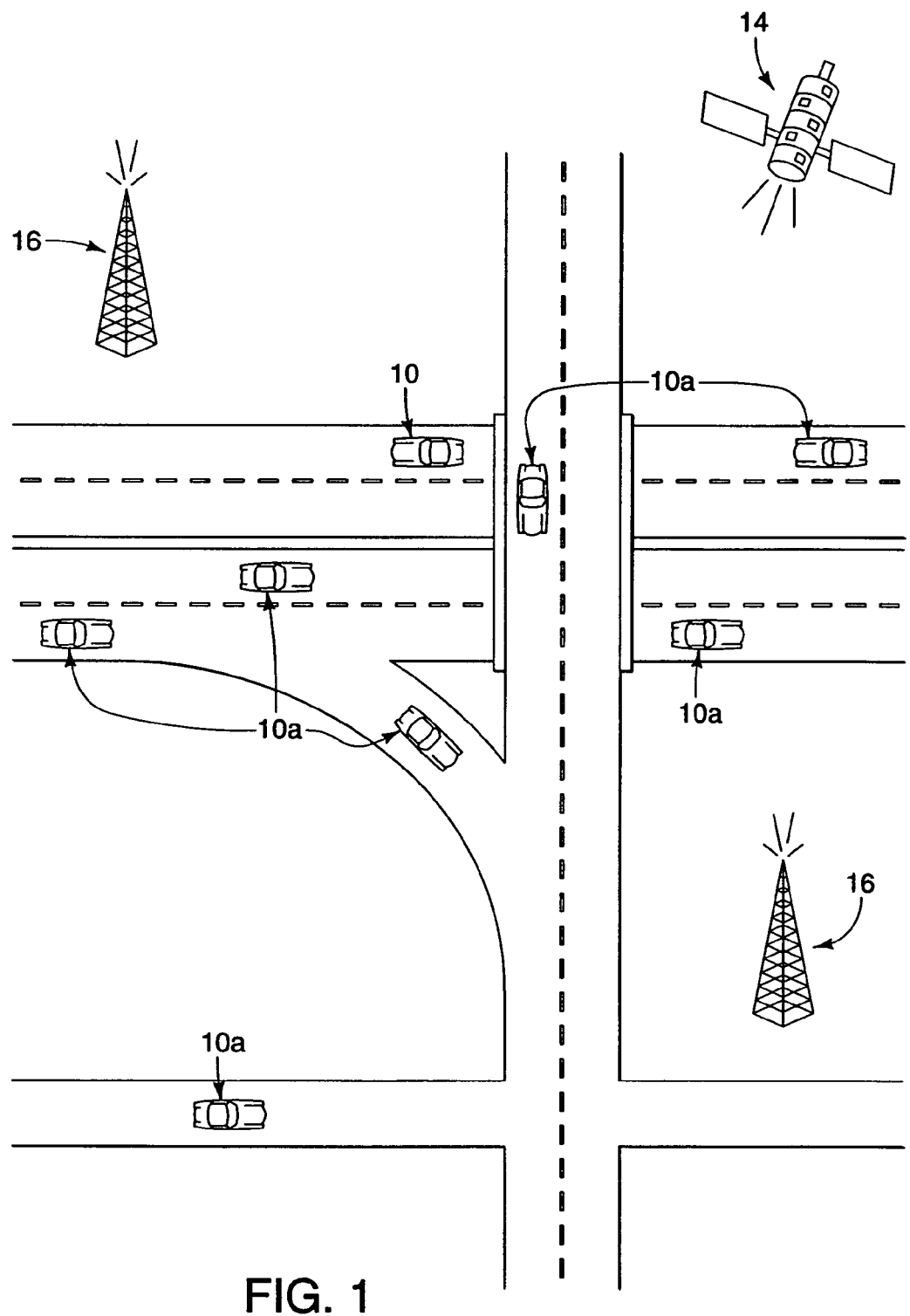
FIG. 1 is a pictorial representation of a two-way wireless communications (DSRC) network showing a plurality of vehicles equipped with each being equipped with an on-board unit (OBU) capable of conducting two-way wireless communications in accordance with the present invention.
Figure 2:
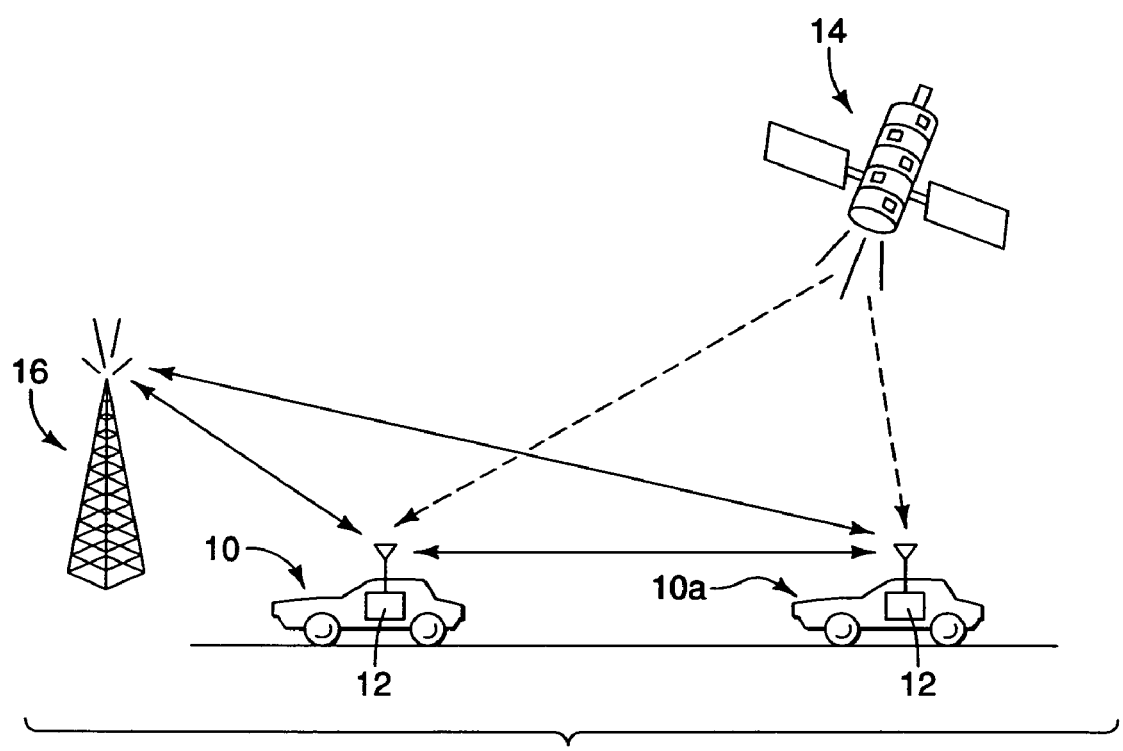
FIG. 2 is a pictorial representation of a two-way wireless communications (DSRC) network showing a pair of vehicles broadcasting vehicle parameter identifiers and receiving information from a satellite and/or a roadside unit in accordance with the present invention.

Referring initially to FIGS. 1 and 2, a two-way wireless communications network is illustrated in which a host vehicle 10 and several neighboring or nearby vehicles 10a are each equipped with a vehicle communication system 12 in accordance with a preferred embodiment of the present invention. The two-way wireless communications network also includes one or more global positioning satellites 14 (only one shown) and one or more roadside units 16 (only two shown) that send and receive signals to and from the vehicles 10 and 10a. In this system, the term "host vehicle" refers to a vehicle among a group of DSRC equipped vehicles or vehicles equipped with two-way wireless communications in accordance with the present invention. The term "neighboring vehicle" refers to DSRC equipped vehicles or vehicles equipped with two-way wireless communications that are located within a communication (broadcasting/receiving) area surrounding the host vehicle in which the host vehicle is capable of either broadcasting a signal to another vehicle within a certain range and/or receiving a signal from another vehicle within a certain range.

As seen in FIG. 2, the vehicle communication system 12 of each of the vehicles 10 and 10a carries out two-way wireless communications between each other as well as with one or more global positioning satellites 14 (only one shown) and one or more roadside units 16 (only one shown). The global positioning satellites 14 and the roadside units 16 are conventional components that are known in the art. The roadside units 16 are equipped with a DSRC unit for broadcasting and receiving signals to the vehicles 10 located with communication (broadcasting/receiving) regions surrounding the roadside units 16. Since global positioning satellites and roadside units are known in the art, the structures of the global positioning satellites 14 and the roadside units 16 will not be discussed or illustrated in detail herein. Rather, it will be apparent to those skilled in the art from this disclosure that the global positioning satellites 14 and the roadside units 16 can be any type of structure that can be used to carry out the present invention.

Figure 3:
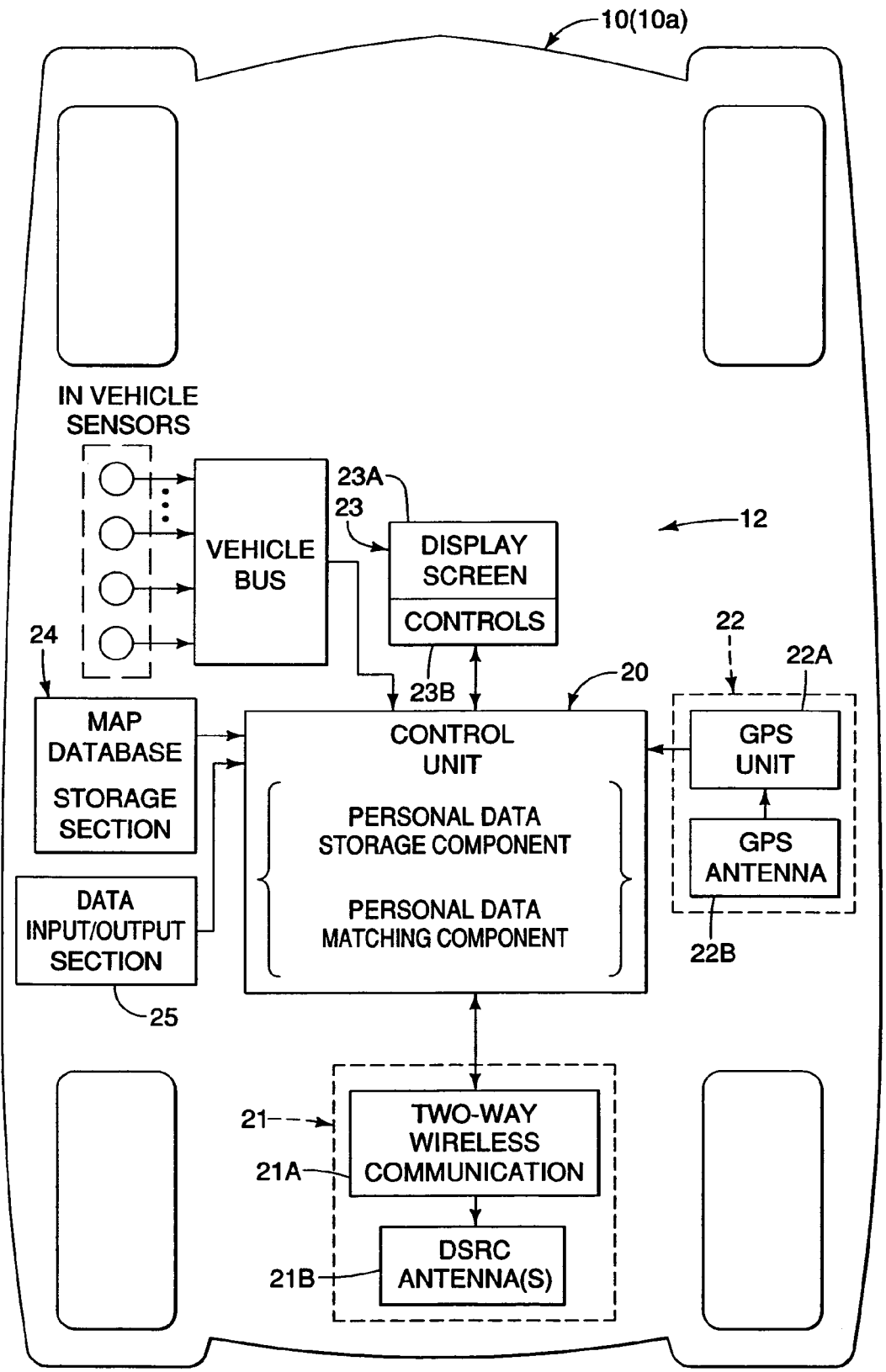
FIG. 3 is a schematic representation of one of the vehicles that is equipped with the on-board unit for conducting two-way wireless communications in accordance with the present invention.
Figure 4:
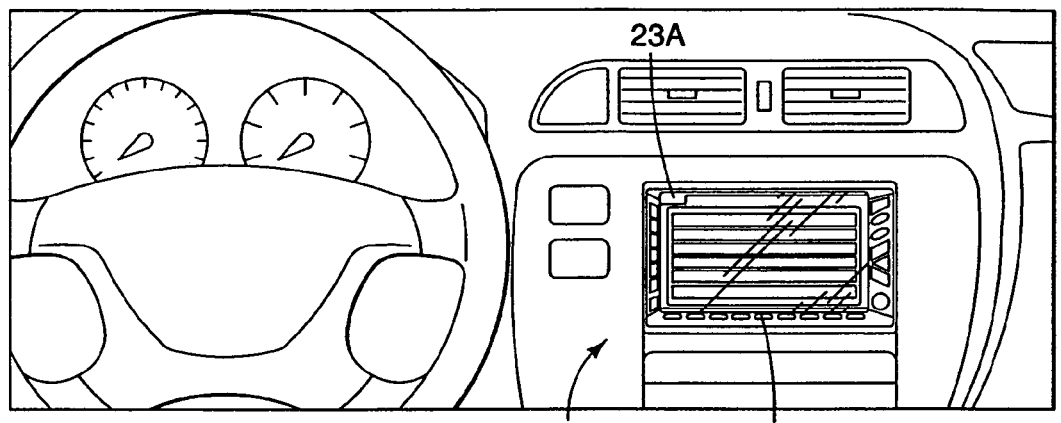
FIG. 4 is an inside elevational view of a portion of the vehicle's interior that is equipped with the on-board unit for conducting two-way wireless communications in accordance with the present invention.
Figure 5:
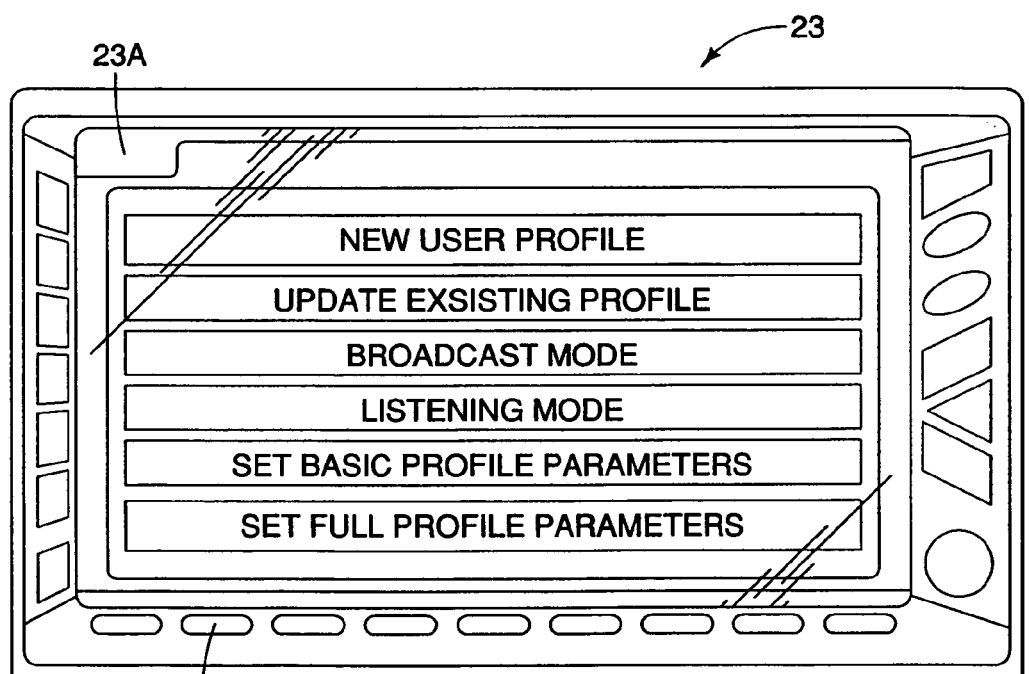
FIG. 5 is a pictorial representation of a first screen display of the vehicle's navigation system that is integrated with the on-board unit in accordance with the present invention.
Figure 8:
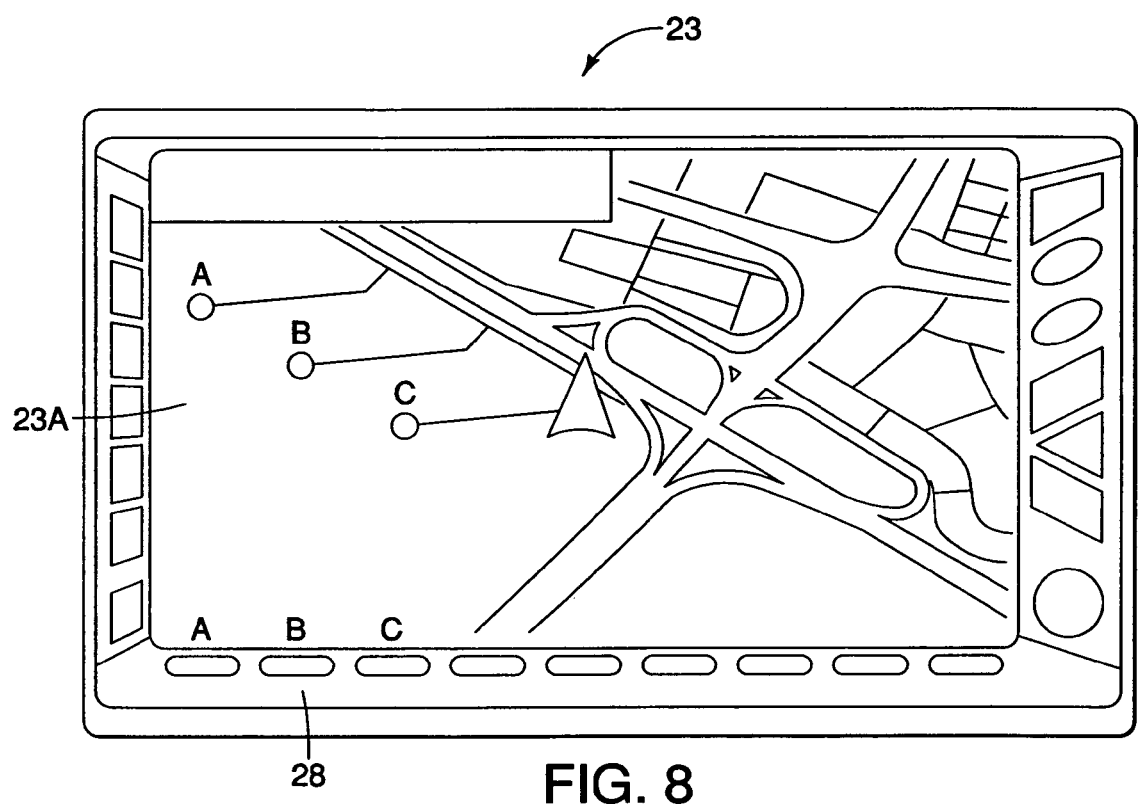
FIG. 8 is a pictorial representation of a fourth screen display of the vehicle's navigation system that is integrated with the on-board unit for conducting in accordance with the present invention.

Referring now to FIG. 3, the vehicle communication system 12 is a vehicle on-board unit (OBU) that basically includes a controller or control unit 20, a two-way wireless communications 21, a global positioning system 22, an onboard vehicle navigation system 23, a map database storage section or component 24 and a data input/output section 25. These systems or components are configured and arranged such that the control unit 20 receives and/or sends various signals to the other component and systems to determine if one of the nearby vehicles 10a (nearby users) within the host vehicle broadcast area surrounding the host vehicle 10 is broadcasting a signal with a nearby user's desired profile requirement that matches a host vehicle user's personal data. In particular, the control unit 20 is configured and/or programmed to carry out this process by executing the steps shown in the flow chart of FIG. 9 (discussed below) in conjunction with various signals to and from the other components and systems. It will be apparent to those skilled in the art from this disclosure that the neighboring or nearby vehicles 10a are also equipped in the same manner as the host vehicle 10 and perform the same processes as described herein.

The control unit 20 preferably includes a microcomputer with a personal data matching program that controls communications with users of the nearby vehicles 10a having similar interests, desires or wants. This matching program can be used to meet people for dating, socializing, selling items, etc. The control unit 20 in one preferred embodiment is integrated into the navigation system 23 such that they share common inputs and outputs. In other words, the controls (inputs and outputs) for operating the navigation system 23 are also used to operate the vehicle communication system 12 to carry out the present invention. Alternatively, separate controls can be used for the vehicle communication system 12 and the navigation system 23. In any event, the control unit 20 also preferably includes other conventional components such as an input interface circuit, an output interface circuit, and storage devices such as a ROM (Read Only Memory) device and a RAM (Random Access Memory) device. The memory circuit stores processing results and control programs such as ones for operation of the two-way wireless communications 21, the global positioning system 22, the navigation system 23 and the map database storage section 24, that are run by the processor(s). The control unit 20 is capable of selectively controlling other DSRC components of the vehicle such as other safety systems as needed and/or desired. It will be apparent to those skilled in the art from this disclosure that the precise structure and algorithms for the control unit 20 can be any combination of hardware and software that will carry out the functions of the present invention. In other words, "means plus function" clauses as utilized in the specification and claims should include any structure or hardware and/or algorithm or software that can be utilized to carry out the function of the "means plus function" clause.

The control unit 20 preferably includes a host vehicle personal data storage component and a host vehicle personal data matching component. Parts of the personal data storage component and parts of the host vehicle personal data matching component are preferably shared with the navigation system 23. For example, the host vehicle personal data storage component includes a host vehicle user input device that is shared with the navigation system 23 as explained below. The personal data storage component and the host vehicle personal data matching component are operatively coupled to the two-way wireless communications 21 to send and receive the host vehicle user profile and the nearby user profiles for carrying out the process of FIG. 9 as explained below.

The host vehicle personal data storage component of the control unit 20 includes a storage device that is configured to store host vehicle user's personal data and store nearby users' desired profile requirement from the nearby users of the nearby vehicles 10a within the host vehicle broadcast area surrounding the host vehicle 10. The host vehicle personal data storage component of the control unit 20 is operatively connected to the two-way wireless communications 21, which is configured broadcast at least some of the host vehicle user's personal data and receive the nearby user's desired profile requirement. The host vehicle personal data storage component of the control unit 20 is further configured to categorize the host vehicle user's personal data into a basic user profile including a selected first portion of the host vehicle user's personal data and a full user profile including a selected second portion of the host vehicle user's personal data. The host vehicle personal data storage component of the control unit 20 is further to provide the basic user profile to the two-way wireless communications 21 prior to the host vehicle personal data matching component determining a match between the host vehicle user's desired profile requirement and the nearby user's desired profile requirement and to provide the full user profile to the two-way wireless communications 21 after the host vehicle personal data matching component determines the match between the host vehicle user's desired profile requirement and the nearby user's desired profile requirement. In other words, the host vehicle two way communication device 21A is configured to send the request for additional data (full user profile) from the nearby user upon the host vehicle personal data matching component determining an initial match between the host vehicle user's desired profile requirement and the nearby user's desired profile requirement. The host vehicle personal data storage component is further configured selectively request the additional data from the nearby user either automatically upon the host vehicle personal data matching component determining the initial match or only after the host vehicle personal data matching component determines the initial match and the user inputs a send command signal. These transmissions will be explained below in more detail with reference to FIG. 9.

The two-way wireless communications 21 includes communication interface circuitry that connects and exchanges information with a plurality of the vehicles 10 that are similarly equipped as well as with the roadside units 16 through a wireless network within the broadcast range of the host vehicle 10. The two-way wireless communications 21 is configured and arranged to conduct direct two way communications between vehicles (vehicle-to-vehicle communications) and roadside units (roadside-to-vehicle communications). Moreover, two-way wireless communications 21 is configured to periodically broadcast a signal in the broadcast area. Thus, the two-way wireless communications 21 includes a regular broadcast channel and a service channel with the host vehicle two way communication device 21A being configured to use the regular broadcast channel to broadcast the basic profile and to use the service channel to unicast the full profile.

As seen in FIG. 3, the two-way wireless communications 21 is an on-board unit that includes a host vehicle two way communication device 21A and one or more antennas 21B. Preferably, the two-way wireless communications 21 has both an omni-directional antenna and a multi-directional antenna. The host vehicle two way communication device 21A is configured to conduct direct short range communications in a host vehicle broadcast area surrounding the host vehicle 10 via the antennas 21B.

As explain below, the host vehicle two way communication device 21A is configured to include a listening mode in which none of the host vehicle user's personal data is broadcasted, but the nearby user's desired profile requirement that is received is stored in a storage device by the host vehicle personal data storage component of the control unit 20. The host vehicle user's personal data forms a host vehicle user profile that is compared to a nearby vehicle user profile by the host vehicle personal data matching component of the control unit 20. Thus, the host vehicle personal data matching component of the control unit 20 is configured to process the host vehicle user profile and the nearby vehicle user profile, when the nearby user's desired profile requirement is received by the host vehicle two way communication device 21A.

In particular, the two-way wireless communications 21 is preferably a dedicated short range communications systems, since the latency time between communications is very low compared to most other technologies that are currently available. However, other two-way wireless communications systems can be used if they are capable of conducting both point-to-point wireless communications and broadcast wireless messages in a limited broadcast area so long as the latency time between communications is short enough. When the two-way wireless communications 21 is a DSRC system, the two-way wireless communications 21 will transmit at a 75 Mhz spectrum in a 5.9 GHz band with a data rate of 1 to 54 Mbps, and a maximum range of about 1,000 meters. Preferably, the two-way wireless communications 21 includes seven (7) non-overlapping channels. The two-way wireless communications 21 will be assigned a Medium Access Control (MAC) address and/or an IP address so that each vehicle in the network can be individually identified.

The two-way wireless communications 21 is configured to periodically broadcast a standard or common message set (CMS) to the neighboring or nearby vehicles 10a and the nearby roadside units 16 that within a prescribed broadcast range of the host vehicle 10. This common message set (CMS) would mostly likely be developed such that all of the DSRC equipped vehicles 10 and 10a would transmit the same type of vehicle parameter identifiers to give relevant kinematical and location information. In other words, preferably a standardized DSRC message set and data dictionary would be established for safety applications that utilize vehicle-to-vehicle and/or vehicle-to-infrastructure communications. For example, the common message set can include preset vehicle parameter identifiers, such as a MAC address, an IP address and/or a vehicle ID number, and variable vehicle parameter identifiers indicative of vehicle location and movement such as a GPS location/vehicle position (longitude, latitude and elevation) with a GPS time stamp, a vehicle heading, and/or a vehicle speed. As explained later, the host vehicle two way communication device 21A is also configured to periodically broadcast at least some of the host vehicle user's personal data and receive the nearby user's desired profile requirement. Preferably, the host vehicle two way communication device 21A is configured to automatically broadcast the host vehicle user's personal data periodically upon activation the vehicle communication system 12. The vehicle communication system 12 will be typically activated when the user turns the ignition key to the "ON" position or the "Accessory" position.

Figure 9:
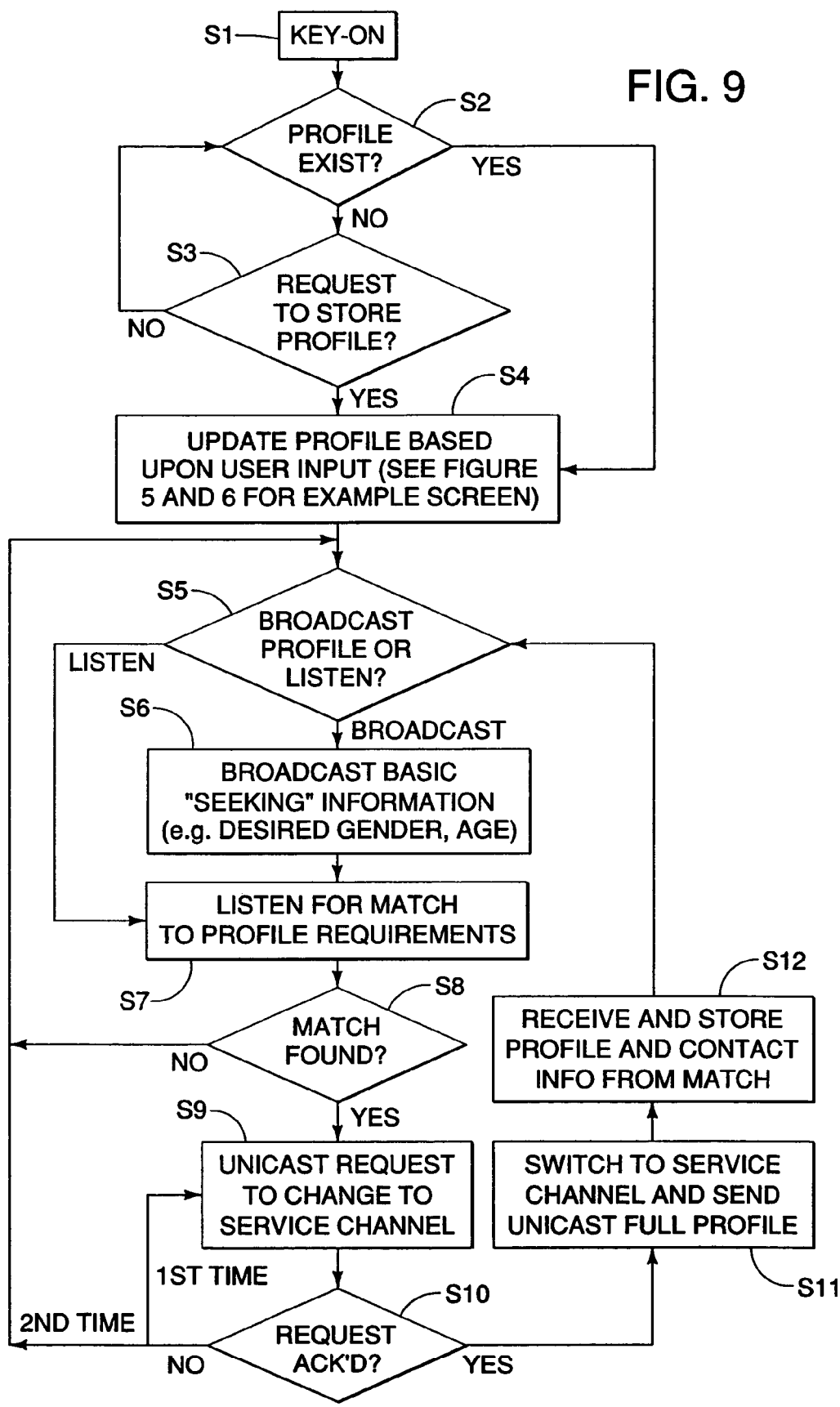
FIG. 9 is a flow chart illustrating the processing executed by the control unit to input, store and broadcast host vehicle user's personal data as well as receive and communicate with a nearby vehicle that matches the host vehicle user's personal data requirements in accordance with the present invention.

Referring now to FIG. 9, one possible process that can be executed by the control unit 20 to carry out the present invention will now be discussed. This process of FIG. 9 is limited to the processing executed in the host vehicle 10. However, it will be apparent to those skilled in the art from this disclosure that the nearby vehicles 10a execute a similar process such that information is exchanged between the host vehicle 10 and the nearby vehicles 10a.

In step S1, the control unit 20 is configured to start the process of communicating with the users of the nearby vehicles 10a having similar interests, desires or wants when the ignition key of the host vehicle 10 is turned on to start the host vehicle 10 or to activate the accessories of the host vehicle 10. The process of communicating with the users of the nearby vehicles 10a is also ended when the ignition key of the host vehicle 10 is turned off. Thus, the host vehicle two way communication device 21A is configured to automatically broadcast the host vehicle user's personal data periodically upon activation the vehicle communication system 12.

Once the ignition key of the host vehicle 10 is turned on, the processing executed by the control unit 20 of the host vehicle 10 proceeds to step S2.

In step S2, the control unit 20 is configured to determine if a user profile exists (stored) that includes the host vehicle user's personal data, which is to be used to search for the users of the nearby vehicles 10a having similar interests, desires or wants. The host vehicle user's personal data can be inputted into the system in a variety of ways. One preferred method is to use the navigation system 23. If no preexisting user profile is stored in a storage device (e.g., hard drive), then the processing executed by the control unit 20 of the host vehicle 10 proceeds to step S3. However, if a user profile exists (stored) in a storage device (e.g., hard drive), then the processing executed by the control unit 20 of the host vehicle 10 proceeds to step S4 as discussed below.

In step S3, the control unit 20 is configured to determine if the user of the host vehicle 10 has inputted a request to store a user profile (i.e., add a new user profile) that includes the host vehicle user's personal data, which is to be used to search for the users of the nearby vehicles 10a having similar interests, desires or wants. If no such request is received, then the processing executed by the control unit 20 of the host vehicle 10 cycles between steps S2 and S3 until a request is received. Of course, the control unit 20 can include a timer which stops the processing after a predetermined amount of time has elapsed. In such a case, the user can manually reactivate the system as long as the ignition key of the host vehicle 10 is in the "ON" position. Once the user of the host vehicle 10 has inputted a request to store a user profile, the processing executed by the control unit 20 of the host vehicle 10 proceeds to step S4.

In step S4, the control unit 20 is configured to display an input screen that allows the user of the host vehicle 10 to input a new user profile, update an existing user profile and/or select one of several preexisting user profiles. The host vehicle user's personal data can be inputted into the system in a variety of ways (e.g., a voice command, a touch screen, a joystick, a keypad, etc.). Once the user of the host vehicle 10 has inputted and/or selected a desired user profile to be broadcasted, the user inputs a command to broadcast the desired user profile or not. Again, this can be accomplished in a variety of ways (e.g., a voice command, a touch screen, a joystick, a keypad, etc.). These input devices form a part of the host vehicle personal data storage component of the control unit 20. Preferably, using these input devices of the host vehicle personal data storage component, the user can categorize the host vehicle user's personal data into a basic user profile including a selected first portion of the host vehicle user's personal data and a full user profile including a selected second portion of the host vehicle user's personal data. The basic profile will be broadcasted periodically by the host vehicle two way communication device 21A prior to the host vehicle personal data matching component determining a match between the host vehicle user's desired profile requirement and the nearby user's desired profile requirement. The full user profile will be unicast by the host vehicle two way communication device 21A after the host vehicle personal data matching component determines the match between the host vehicle user's desired profile requirement and the nearby user's desired profile requirement.

Preferably, during step S4, the user of the host vehicle 10 has the option to enter a listening mode and a broadcast mode. In the listening mode, the control unit 20 operates the two-way wireless communications 21 so as to listen for the nearby user's desired profiles. In the broadcast mode, the control unit 20 operates the two-way wireless communications 21 to broadcast the desired user profile and to listen for the nearby user's desired profiles.

Next, the processing executed by the control unit 20 of the host vehicle 10 proceeds to step S5. In step S5, the control unit 20 is configured to determine if the system is in the listening mode or the broadcast mode. If the system is in the broadcast mode, then the processing executed by the control unit 20 of the host vehicle 10 proceeds to step S6. However, if the system is in the listening mode, then the processing executed by the control unit 20 of the host vehicle 10 proceeds to step S7 as discussed below.

In step S6, the control unit 20 is configured to start broadcasting a basic message from the user profile that was selected. The basic message includes only a part of the full user profile that was selected. Thus, the user can select what information from the user profile will be regularly broadcasted.

Next, the processing executed by the control unit 20 of the host vehicle 10 proceeds to step S7. In step S7, the control unit 20 is configured to start listening for basic messages from the nearby vehicles 10a. Once a basic message from the nearby vehicle 10a is received, the processing executed by the control unit 20 of the host vehicle 10 proceeds to step S8.

In step S8, the control unit 20 is configured to determine if the basic message received from the nearby vehicle 10a matches the user profile that was selected. This comparison process can be conducted in a variety of ways to determine whether a match exists. For example in one embodiment, in order for a match to be determined in step S8, the user could select certain criteria that must match exactly and/or select certain criteria that a prescribed percentage of matching must occur. Thus, in step S8, the system culls out the basic messages from the nearby vehicles 10a in which the user of the host vehicle 10 would most likely want to communicate with, i.e., nearby users having similar interests, desires or wants. If a match is found, then with selected data mode, then the processing executed by the control unit 20 of the host vehicle 10 proceeds to step S9. However, if the basic message received from the nearby vehicle 10a does not match the user profile that was selected, then the processing executed by the control unit 20 of the host vehicle 10 proceeds back to step S5 to repeat the broadcasting and/or listening process again until a match is found or the system is turned off.

In step S9, the control unit 20 is configured to transmit a unicast request signal (i.e., a direct private communication) to the nearby vehicle 10a that broadcasted the basic message that was determined to match the selected user profile in the host vehicle 10. The unicast request signal basically requests that the nearby vehicle 10a with the matching basic message switch to a service channel so that a private conversation can be conducted between the host vehicle 10 and the nearby vehicle 10a. The basic messages that are broadcasted by the host vehicle 10 and the nearby vehicle 10a preferably include identification data that allows the host vehicle 10 and the nearby vehicle 10a to establish unicast communications (i.e., direct private communications).

Next, the processing executed by the control unit 20 of the host vehicle 10 proceeds to step S10. In step S10, the control unit 20 is configured to determine if the unicast request signal has been received and acknowledged by the nearby vehicle 10a. Thus, this system includes a program for determining if an acknowledgement is to be transmitted by conducting a similar comparison of the basic messages as executed in step S8. If no acknowledgement is received, then the processing executed by the control unit 20 of the host vehicle 10 proceeds back to step S9 to repeat transmission of the unicast request signal that requests the nearby vehicle 10a to switch to a service channel to establish unicast communications. This cycle can be repeat as many times as desired, but if no acknowledgement is received after a prescribed number of times (e.g., two times), then the processing executed by the control unit 20 of the host vehicle 10 proceeds back to step S5 to repeat the broadcasting and/or listening process again until a match is found or the system is turned off.

However, if the nearby vehicle 10*a* transmits an acknowledgement to the host vehicle 10, then the processing executed by the control unit 20 of the host vehicle 10 proceeds to step S11. In step S11, the control unit 20 is configured to switch the two-way wireless communications 21 to a selected service channel and then transmit a unicast signal that includes a full user profile of the user of the host vehicle 10. The unicast signal that includes a request for additional data from the nearby user. Thus, the unicast signal acts so as to automatically request for additional data from the nearby user upon the host vehicle personal data matching component (step S8) determining the initial match. The informational data that makes up the "full user profile" does not necessarily include all of the user profile, but rather can merely include more data than the original basic message. The host vehicle two way communication device 21A is configured selectively request the additional data from the nearby user either automatically upon the host vehicle personal data matching component determining the initial match or only after the host vehicle personal data matching component determines the initial match and the user inputs a send command signal from the host vehicle user via a host vehicle user input device of the navigation system 23. Next, the processing executed by the control unit 20 of the host vehicle 10 proceeds to step S12.

In step S12, the control unit 20 is configured to receive and store profile and contact information from the nearby vehicle 10*a* with the matching data. At point, profile and contact information can be viewed (displayed by the navigation system 23 and/or download to a portable media) at a later date. Alternatively, further profile and contact information can be immediately communicated to the user by displaying on the navigation system 23 or the system producing a synthesized voice output that verbal communicates the profile and contact information to the user. Also, at point, further two-way wireless communications can be conducted by inputting a spontaneous user message (e.g., a voice or text message) that response to the user of the nearby vehicle 10*a* with the matching data.

In any event, the processing executed by the control unit 20 of the, host vehicle 10 proceeds to step S5 to repeat the broadcasting and/or listening process again until a match is found or the system is turned off.

The host vehicle user's personal data can be inputted into the system in a variety of ways. One preferred method is to use the navigation system 23. If a profile exists (stored) in a storage device (e.g., hard drive), then the processing executed by the control unit 20 of the host vehicle 10 proceeds to step S3.

The global positioning system 22 is a conventional global positioning system that is configured and arranged to receive global positioning information of the host vehicle 10 in a conventional manner. The global positioning system 22 can be used to provide information to the nearby vehicle 10*a* of the location of the host vehicle 10 so that a meeting place can be set up if desired. Basically, the global positioning system 22 includes a GPS unit 22A that is a receiver for receiving a signal from the global positioning satellite 18 via and a GPS antenna 22B. The signal transmitted from the global positioning satellite 18 is received at regular intervals (e.g. one second) to detect the present position of the host vehicle. The GPS unit 22A preferably has an accuracy of indicting the actual vehicle position within a few meters or less. This data (present position of the host vehicle) is fed to the control unit 20 for processing and to the navigation system 23 for processing.

The navigation system 23 is a conventional navigation system that is configured and arranged to receive global positioning information of the host vehicle in a conventional manner. Preferably, inputting and displaying parts of the host vehicle personal data storage component are built into the navigation system 23. The navigation system 23 can be used to the user to locate meeting place for meeting with the user of the nearby vehicle 10*a* if desired. Basically, the navigation system 23 includes a color display unit 23A and an input controls 23B. The navigation system 23 can have its own controller with microprocessor and storage, or the processing for the navigation system 23 can be executed by the control unit 20. In either case, the signals transmitted from the global positioning satellites 14 are utilized to guide the vehicle 10 in a conventional manner.

In the illustrated embodiment, the color display unit 23A constitutes an output part of the host vehicle personal data matching component and the host vehicle personal data storage component of the control unit 20. The color display unit 23A is configured to display both the nearby user's desired profile and the host vehicle user's personal data. Thus, the color display unit 23A is controlled by the control unit 20 to display the screens shown in FIGS. 5 to 8. Preferably, the color display unit 23A is a touch screen so that it also forms part of the host vehicle personal data storage component. The input controls 23B also forms part of the host vehicle personal data storage component. In other words, the color display unit 23A and the input controls 23B constitutes a host vehicle user input device that is manually operated by the user to setup the vehicle communication system 21 and to carry on spontaneous conversations with the nearby user via the host vehicle two way communication device 21A using the service channel. The host vehicle two way communication device 21A is configured to only send the full profile after receiving a send command signal from the host vehicle user via the host vehicle user input device.

The map database storage section 24 configured to store road map data as well as other data that can be associated with the road map data such as various landmark data, fueling station locations, restaurants, etc. The map database storage section 24 preferably includes a large-capacity storage medium such as a CD-ROM (Compact Disk-Read Only Memory) or IC (Integrated Circuit) card. The map database storage section 24 is configured to perform a read-out operation of reading out data held in the large-capacity storage medium in response to an instruction from the control unit 20 and/or the navigation system 23. The map database storage section 24 is used by the control unit 20 to acquire the map information necessary as needed and or desired for use in predicting a collision. The map database storage section 24 is also used by the navigation system 23 to acquire the map information necessary for route guiding, map display, and direction guide information display. Preferably, the map information of this embodiment includes at least information necessary for offering of the map information and route guiding as performed by a general navigation device and necessary for displaying the direction guide information of the embodiment.

As used herein to describe the term "detect" as used herein to describe an operation or function carried out by a component, a section, a device or the like includes a component, a section, a device or the like that does not require physical detection, but rather includes determining, measuring, modeling, predicting or computing or the like to carry out the operation or function. The term "configured" as used herein to describe a component, section or part of a device includes hardware and/or software that is constructed and/or programmed to carry out the desired function. Moreover, terms that are expressed as "means-plus function" in the claims should include any structure that can be utilized to carry out the function of that part of the present invention. The terms of degree such as "substantially", "about" and "approximately" as used herein mean a reasonable amount of deviation of the modified term such that the end result is not significantly changed. For example, these terms can be construed as including a deviation of at least ±5% of the modified term if this deviation would not negate the meaning of the word it modifies.

While only selected embodiments have been chosen to illustrate the present invention, it will be apparent to those skilled in the art from this disclosure that various changes and modifications can be made herein without departing from the scope of the invention as defined in the appended claims. Furthermore, the foregoing descriptions of the embodiments according to the present invention are provided for illustration only, and not for the purpose of limiting the invention as defined by the appended claims and their equivalents. Thus, the scope of the invention is not limited to the disclosed embodiments.

What is claimed is:

1. An onboard vehicle communication system comprising:
a host vehicle two way communication device configured to conduct direct short range communications in a host vehicle broadcast area surrounding a host vehicle;
a host vehicle personal data storage component configured to store host vehicle user's personal data and store a nearby user's desired profile requirement from a nearby user within the host vehicle broadcast area surrounding the host vehicle, the host vehicle personal data storage component being operatively connected to the host vehicle two way communication device, which is configured to receive the nearby user's desired profile requirement; and
a host vehicle personal data matching component configured to compare the host vehicle user's personal data with the nearby user's desired profile requirement on a vehicle equipped with the onboard vehicle communication system.

2. The onboard vehicle communication system according to claim 1, wherein
the host vehicle two way communication device includes a listening mode in which none of the host vehicle user's personal data is broadcasted by the host vehicle two way communication device, but the nearby user's desired profile requirement is stored by the host vehicle personal data storage component and processed by the host vehicle personal data matching component, when the nearby user's desired profile requirement is directly received by the host vehicle two way communication device from the nearby user within the host vehicle broadcast area surrounding the host vehicle.

3. The onboard vehicle communication system according to claim 1, wherein
the host vehicle two way communication device includes a wireless communication device.

4. The onboard vehicle communication system according to claim 1, wherein
the host vehicle personal data storage component includes a host vehicle user input device to be manually operated to carry on spontaneous conversation with the nearby user via the host vehicle two way communication device.

5. The onboard vehicle communication system according to claim 1, wherein
the host vehicle personal data storage component includes a display configured to view a nearby user's personal data.

6. The onboard vehicle communication system according to claim 1, wherein
the host vehicle personal data storage component includes a display configured to view the host vehicle user's personal data.

7. The onboard vehicle communication system according to claim 6 wherein
the host vehicle two way communication device is further configured to automatically broadcast the host vehicle user's personal data periodically upon activation the vehicle communication system.

8. The onboard vehicle communication system according to claim 1, wherein
the host vehicle personal data storage component is a part of an onboard vehicle navigation system.

9. The onboard vehicle communication system according to claim 1, wherein
the host vehicle personal data storage component is further configured to categorize the host vehicle user's personal data into a basic profile including a selected first portion of the host vehicle user's personal data and a full profile including a selected second portion of the host vehicle user's personal data.

10. The onboard vehicle communication system according to claim 9, wherein
the host vehicle personal data storage component is further configured to provide the basic profile to the host vehicle two way communication device prior to the host vehicle personal data matching component determining a match between the host vehicle user's personal data and the nearby user's desired profile requirement and to provide the full profile to the host vehicle two way communication device after the host vehicle personal data matching component determines the match between the host vehicle user's personal data and the nearby user's desired profile requirement.

11. The onboard vehicle communication system according to claim 10, wherein
the host vehicle two way communication device includes a regular broadcast channel and a service channel with the host vehicle personal data storage component being configured to use the regular broadcast channel to broadcast the basic profile and to use the service channel to unicast the full profile.

12. The onboard vehicle communication system according to claim 10, wherein
the host vehicle personal data storage component includes a host vehicle user input device, and the host vehicle two way communication device is configured to only send the full profile after receiving a send command signal from the host vehicle user via the host vehicle user input device.

13. The onboard vehicle communication system according to claim 12, wherein
the host vehicle personal data storage component includes a host vehicle user input device configured to be manually operated to carry on spontaneous conversation with the nearby user via the host vehicle two way communication device using the service channel.

14. The onboard vehicle communication system according to claim 1, wherein
the host vehicle personal data storage component is further configured to send a request for additional data from the nearby user via the host vehicle two way communication device upon the host vehicle personal data matching component determining an initial match between the host vehicle user's personal data and the nearby user's desired profile requirement.

15. The onboard vehicle communication system according to claim 14, wherein
the host vehicle personal data storage component is further configured to send the request for additional data from the nearby user automatically upon the host vehicle personal data matching component determining the initial match.

16. The onboard vehicle communication system according to claim 14, wherein
the host vehicle personal data storage component is further configured to send the request for additional data from the nearby user only after the host vehicle personal data matching component determines the initial match and receiving a send command signal from the host vehicle user via a host vehicle user input device.

17. The onboard vehicle communication system according to claim 1, wherein
the host vehicle two way communication device is configured to broadcast at least some of the host vehicle user's personal data.

* * * * *